July 3, 1962     J. E. VAN TUYL     3,042,071
LIQUID FEEDING APPARATUS
Filed July 1, 1957
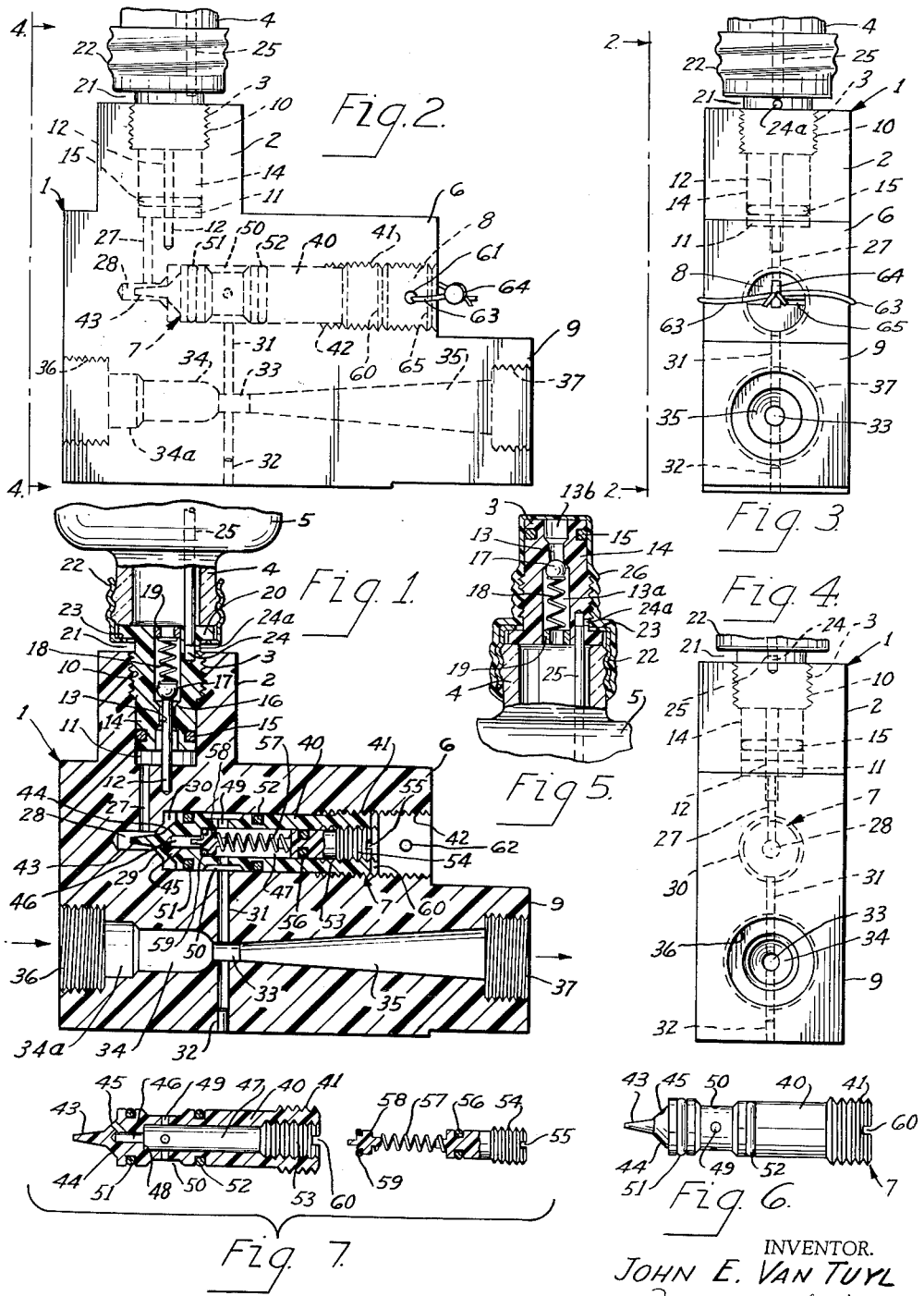
INVENTOR.
JOHN E. VAN TUYL
BY
ATTORNEYS.

United States Patent Office 3,042,071
Patented July 3, 1962

3,042,071
LIQUID FEEDING APPARATUS
John E. Van Tuyl, Cleveland, Ohio, assignor to
Albert C. Mader, Parma, Ohio
Filed July 1, 1957, Ser. No. 669,145
3 Claims. (Cl. 137—454.5)

This invention, which is an improvement on that of prior application Serial No. 508,877, filed May 17, 1955, now Patent No. 2,874,719 for "Liquid Feeding Apparatus," has to do with a system for feeding an additive into a moving liquid.

Like such prior invention, the present invention consists in and has for one of its objects the provision of a feeding device of simple construction which can readily be disassembled for inspection, cleaning and replacement of parts. A specific object is the provision of novel means for coupling the supply bottle to the remainder of the system. A further object is the provision of a valve cartridge lending itself to introduction and removal as a unit, thereby greatly facilitating replacement in the field. Still a further object is the provision of an ejector section in which not only the approach and discharge passages but also the throat itself are formed in the material of which the feeding device is constructed, thereby obviating the need for separate tubes, cones, and similar constricting devices.

The invention further consists in and has as an object the provision of a housing of a material that is sufficiently transparent to permit the operation of the feeding device to be observed without disassembling it and setting it up separately for testing. According to this phase of the invention, at least the housing is made of a highly transparent synthetic resin. In addition, the valve cartridge and the means for holding the supply bottle in place on the mounting portion of the housing may be of the same or a similar transparent synthetic resin; on the other hand, one or both of these assemblies, particularly the valve cartridge, may if desired be made of a corrosion-resistant metal. In general, the major parts of the housing, excluding more or less incidental components, may to advantage be formed of a material facilitating observation of the device under working conditions.

Other objects, advantages and features of the invention will be apparent from the description which follows and from the accompanying drawings, in which:

FIGURE 1 is a vertical central section through a feeding device within the purview of the present invention showing the mounting portion; i.e., the portion by which the supply bottle is connected to the housing, the valve portion and the ejector portion.

FIGURE 2 is a corresponding side elevation showing the feeding device as it appears with the sealing plug in place.

FIGURES 3 and 4 are end elevations.

FIGURE 5 is a section through the connector for the supply bottle, the bottle and connector being shown in the position normally assumed before the supply bottle is coupled to the housing.

FIGURE 6 is a side elevation of the valve cartridge.

FIGURE 7 is an exploded view, mainly in section, showing the components of the valve cartridge.

Housing 1, which may be made of almost any suitable plastic material that is sufficiently resistant to corrosion, is preferably made from a highly transparent synthetic resin. A number of synthetic resins having a high degree of transparency are commercially available at the present time, among them the methyl methacrylate resin sold by E. I. du Pont de Nemours & Co. under the trademark "Lucite" and the polycarbonate resin sold by General Electric Company under the trademark "Lexan." These and similar materials are available in solid forms lending themselves to shaping to provide the configuration shown in the drawings. If desired, however, they may be cast to form the housing in something approximating the desired final shape.

As will be observed from FIGURE 1, housing 1 includes a vertically rising mounting portion 2 which takes the exterior form of a cube but which, if desired, may be formed after the fashion of a prism or cylinder. It is not solid but so formed as to permit it to accommodate an exteriorly threaded connector 3. To the latter is attached the neck 4 of a supply bottle 5 from which an additive in liquid form may be introduced into the system. Below mounting portion 2 is a horizontally extending valve portion 6 embodying a valve cartridge 7 and an end plug 8. Below valve portion 6 is a horizontally extending ejector portion 9. It will be noted from FIGURES 3 and 4 that the long axes of valve portion 6 and ejector portion 9 lie one above the other in the same vertical plane. This arrangement not only serves to reduce the size of housing 1 to a minimum but makes it easy to incorporate the housing in a typical water supply system for the purpose of introducing a liquid additive, regardless of whether the water is for domestic or for non-domestic uses.

Below the threaded stretch 10 of mounting portion 2 is a generally cylindrical hollow 11, best seen in FIGURE 1. Projecting upward from the base of hollow 11 is a vertically extending plastic pin 12 the function of which is to un-seat a check valve forming part of connector 3 as hereinafter explained. Pin 12 projects upward into connector 3 through a vertical passageway 13. This passageway is of hourglass shape, having relatively wide bores 13a and 13b at its ends. Whereas bore 13a extends through the threaded portion of connector 3, bore 13b is in the generally cylindrical leading end 14 which, seen as in FIGURE 1, extends downward into the cylindrical hollow 11 just below the threaded stretch 10 of mounting portion 2. Leading end 14 is provided with an O-ring seal 15 to preclude leakage past its exterior surface.

As appears from FIGURES 1 and 5, passageway 13 is provided with a valve seat 16 at the inner end of bore 13a. Cooperating with valve seat 16 is a plastic ball valve 17 that is biased toward closed position by a plastic spring 18. At its outer end, spring 18 bears against an annular plastic spring follower 19 that is fastened in place in the outer end of bore 13a. As the leading end 14 of connector 3 is forced downwardly into cylindrical hollow 11 in mounting portion 2, plastic pin 12 comes to project increasingly into bore 13, finally displacing plastic ball valve 17 from valve seat 16. When connector 3 is in its final position in mounting portion 2, valve 17 is fully open as a result of the displacement brought about by pin 12, thus permitting liquid additive to flow through passageway 13 into the cylindrical hollow 11 at the base of mounting portion 2.

Outwardly of spring retainer 19, connector 3 is provided with a radially extending terminal flange 20 formed by cutting or otherwise introducing an annular channel 21 into connector 3 adjacent the threaded portion thereof. Flange 20 and channel 21 coact with a threaded plastic coupling member 22 which over the greater portion of its length conforms in shape to the shape of neck 4 of bottle 5. The outer end of coupling member 22 is formed as an inwardly directed flange 23 that encompasses the end of connector 3 in tight engagement with terminal flange 20. Thus the possibility of leakage is effectively precluded.

It will be noted from FIGURE 1 that a short vertical bore 24 accommodating a tube 25 extends through terminal flange 20 into the threaded portion of connector 3 transversely to annular channel 21. Bore 24 has a branch 24a which permits air to flow into tube 25, as a result of which the additive in bottle 5 can move downward through the central opening in spring retainer 19. In consequence, passageway 13, bores 13a and 13b, and cylindrical hollow 11 fill with the liquid in bottle 5. Any air that might otherwise be present in them passes upward through connector 3 into the interior of the bottle 5, where it collects at the top and becomes mixed with air entering through tube 25.

Connector 3 may, if desired, be formed of some suitable corrosion-resistant metal, but preferably is made and in FIGURES 1 and 5 is illustrated as formed of the same transparent synthetic resin of which housing 1 is formed.

Bottle 5, with connector 3 in place on the outer end of neck 4, is a commercial product in the sense that the additive is purveyed in such containers. Before bottle 5 is applied to mounting portion 2 of housing 1, neck 4 and connector 3 are covered as shown in FIGURE 5 by a cup-like sealing film 26 that extends from the base of neck 4 to and over the flat outer face of leading end 14 of connector 3. This film is of the kind conventionally employed in sealing the stoppers of bottles, being formed of regenerated cellulose that is shrunk and dried in place. Until such time as it is desired to install the bottle on mounting portion 2 of housing 1, connector 3 is protected by film 26, thus precluding contamination of the contents of the bottle. When the bottle is about to be installed, film 26 is removed, after which connector 3 is threaded into mounting portion 2 of housing 1.

Extending downward from cylindrical hollow 11 in mounting portion 2 is a vertical bore 27 which intersects a short horizontally extending opening 28, located as shown in FIGURE 1. Opening 28, which is blind, is provided with a frusto-conical valve seat 29 where its open end communicates with the long cylindrical opening 30 in which valve cartridge 7 is located. Valve cartridge 7 is adjustably positioned in cylindrical opening 30, as will appear. Assuming that valve cartridge 7 is so positioned as to permit of it, the additive in bottle 5 passes through bore 27 into openings 28 and 30. It escapes from the latter through a vertically extending bore 31 the outer end of which is plugged at 32.

Vertical bore 31 intersects the throat 33 of a Venturi tube that is formed in ejector portion 9 of housing 1. The Venturi tube consists of throat 33, an approach chamber 34 and a discharge chamber 35, all of which are formed as voids in ejector portion 9. No separate cones or similar constricting elements are used. An intermediate passageway 34a intervenes between approach chamber 34 and the threaded opening 36 for the fitting (not shown) by which the water line is coupled to housing 1 at the entry end of the housing. A similar threaded opening 37 is provided at the exit end of the housing adjoining the wide end of discharge chamber 35. The direction of travel in and out of housing 1 is indicated in FIGURE 1 by the arrows adjacent openings 36 and 37.

Assuming that valve cartridge 7 is properly located in the desired position in housing 1, additive admitted as already described to long cylindrical opening 30 in valve portion 6 of housing 1 travels downward through bore 31 to the throat 33 in the Venturi tube. While gravity is a factor, in the main it is the water passing into and out of ejector portion 9 by way of threaded openings 36 and 37 which produces the desired flow of the additive. At throat 33, a large quantity of water is passing at a high rate of speed through the Venturi tube incorporated in ejector portion 9 of housing 1. This movement of the water through throat 33 of ejector portion 9 creates a suction that promotes additive flow through bore 31.

Valve cartridge 7, best seen in FIGURE 6, takes the form of a self-contained unit that may readily be introduced into and withdrawn from the open end of cylindrical opening 30, thus facilitating its replacement if circumstances make it necessary. Like connector 3, it can be made of a suitable corrosion-resistant metal, but in the drawings it is shown in its preferred form; viz., as molded of a highly transparent synthetic resin similar to that of which housing 1 is formed. Valve cartridge 7 is characterized, inter alia, by an elongated valve body 40 provided with a threaded end portion 41 for engaging a threaded portion 42 at the outer end of cylindrical opening 30.

At its leading end, valve cartridge 7 is formed after the fashion of a needle valve, being provided with a nose 43 and a frusto-conical seating portion 44 by which, if desired, it can be made to close against valve seat 29. Normally valve cartridge 7 is so located in cylindrical bore 30 that there is a clearance between valve seat 29 and seating portion 44 sufficient to permit the additive in supply bottle 5 to pass between them. This clearance may be increased or decreased by adjusting the position of valve cartridge 7 in cylindrical opening 30. If decreased, it may be reduced to a point where all flow between openings 28 and 30 is cut off.

Extending normally to seating portion 44 is a passageway 45, best seen in FIGURE 7, by which additive admitted to cylindrical opening 30 can travel from the exterior to the interior of valve body 40. Liquid traveling from the outside to the inside of the valve cartridge in this manner first enters a short, narrow horizontally-extending bore 46 which communicates with a wide bore 47 of much greater length. Where narrow bore 46 adjoins wide bore 47 there is a transverse shoulder 48 (FIGURE 7) that is used for seating the plastic check valve that appears at this point in FIGURE 1. This check valve opens when the pressure in bore 31 is reduced as a result of the flow of water through ejector portion 9 of housing 1. It closes when such flow is interrupted, thereby preventing water under pressure from traveling upward into connector 3 and supply bottle 5.

Referring again to FIGURE 7, it will be noted that four lesser bores 49 extend radially outward from wide bore 47. The function of bores 49 is to permit additive arriving in the interior of valve body 40 to pass outwardly into an annular channel 50 formed in valve body 40 somewhat to the rear of its leading end. Channel 50 is flanked by O-ring seals 51 and 52. Bore 31 is at all times in open communication with it. Thus additive passing into valve body 40 in the manner already described, by escaping through radial bores 49 into annular channel 50, can flow into bore 31 in ejector portion 9 of housing 1.

At the outer end of wide bore 47 is a threaded portion 53 for accommodating a plastic spring follower 54 that is formed as shown in FIGURE 7. At its outer end, it is provided with a slot 55 for a screw driver by means of which its position in valve body 40 may be adjusted. An O-ring seal 56 prevents additive from escaping from wide bore 47 through the threaded opening 53 at the outer end of valve body 40. At its inner end, spring follower 54 has a seat for a light coil spring 57 of stainless steel by means of which the previously-mentioned plastic check valve, designated 58 in FIGURE 7, is biased toward shoulder 48 in valve body 40. Check valve 58 is preferably formed as shown in FIGURE 7, being provided with an O-ring seal 59 which engages shoulder 48. In its movement check valve 58 is guided by the walls of wide bore 47 in valve body 40.

In order to adjust the position of valve cartridge 7 in valve portion 6 of housing 1, valve body 40 is provided at its trailing end with slots 60 for the reception of a manipulating tool. To gain access to valve cartridge 7, it is first necessary to remove plug 8. To prevent unauthorized persons from tampering with valve cartridge 7, as by changing the action of check valve 58 by adjusting spring follower 54, plug 8 is provided with a bore 61 adapted to line up with horizontal bores 62 in valve portion 6 of housing 1. Through bores 61 and 62 a suitable wire 63 may be passed. The ends of the wire are brought and held together at the outer end of plug 8 by means of a lead seal 64 which must be destroyed if access is to be had to end slot 65 in plug 8.

Thus the invention provides an exceedingly simple feeding device in which all moving parts are confined to two subassemblies, one of them the connector for the supply bottle and the other the valve cartridge. The housing itself is of unitary construction, preferably being formed in integral fashion of a single mass of material. In it are an opening for the supply bottle connector, an opening for the valve cartridge, and openings forming the throat, approach chamber and discharge chamber for the Venturi tube, all interconnected to permit control of the flow through the housing. If, as in the preferred embodiment of the invention, the housing and practically all of its parts are made of a highly transparent synthetic resin, the day-to-day operation of the feeding device may be closely observed without having to disassemble it and set it up separately for test purposes.

The valve cartridge which forms part of the invention has the important practical advantage that it can be introduced and withdrawn as a unit, thereby greatly facilitating its replacement in the event of malfunction of any parts that might tend to interfere with the operation of the device as a whole. If, for example, there is reason to believe that the passageways in the valve cartridge have become blocked by extraneous materials, wholly or in part, it is a very simple matter indeed to replace the valve cartridge in its entirety, returning the faulty valve cartridge for inspection and repair to service facilities that may or may not be far removed from the point of use. The valve portion of the housing; i.e., the section which incorporates the valve cartridge, is so located that access to the valve cartridge presents no problem except as the tamper-proof feature provided by the sealing plug tends to prevent unauthorized manipulation of the needle valve, check valve or both. When the proper settings have been determined and made, the feeding device can be continued in operation indefinitely with the assurance that tampering, if attempted, will reveal itself by destruction of the seal that bars access to the valve cartridge.

Not only this, but the invention provides a highly practicable method of interconnecting the supply bottle and the housing, as by attaching directly to the neck of the bottle a connector provided with a displaceable valve. The arrangement of parts is such that a unitary cup-shaped film protecting against contamination can readily be applied to the neck of the bottle, to the threaded portion of the connector, and to the cylindrical leading end in which is incorporated the O-ring seal that precludes leakage between the connector and the mounting portion of the housing. When the time comes to mount the bottle on the housing, it is a simple matter to destroy the protective film, invert the bottle, and thread the connector into the mounting portion of the housing.

The invention lends itself to use in any system of a kind in which a simple, highly transparent feeding device can advantageously be incorporated in a domestic or commercial water supply line. There it can remain permanently except as occasionally it may become desirable to remove it for cleaning after long intervals of virtually continuous use. The previously mentioned sub-assemblies; i.e., the valve cartridge and the connector for the supply bottle, can readily be introduced, removed, and re-introduced, all without interrupting for more than a few minutes the continuing operation of the system as a whole. The supply bottle with connector attached may, without endangering the contents by contamination, be sold, shipped, stored, and, when necessary, substituted for an empty supply bottle.

It is intended that the patent shall cover, by summarization in appended claims, all features of patentable novelty residing in the invention.

What is claimed is:

1. In a system for feeding an additive at a predetermined rate into a confined moving liquid, a combination comprising a housing having a generally cylindrical opening therein; inlet means in the housing for supplying additive to and outlet means in the housing for removing additive from said generally cylindrical opening, said inlet means and said outlet means being offset laterally from each other; a first valve seat in said generally cylindrical opening between said inlet means and said outlet means; a generally cylindrical valve body manually actuable toward and from said first valve seat within the confines of said generally cylindrical opening having an axially extending flow opening therein, said valve body having a circumferential channel in its exterior surface outwardly of said axially extending flow opening; sealing means downstream of said first valve seat between the housing and the valve body at each of the two ends of the circumferential channel; a passageway downstream of said first valve seat leading from the exterior of the valve body to the axially extending flow opening in the valve body; a passageway leading from the axially extending flow opening in the valve body to the circumferential channel; a second valve seat and valve located interiorly of the valve body, said second valve seat and valve being adapted to permit or prevent flow between the passageways leading to and from the axially extending flow opening in the valve body; means in the valve body resiliently backing the second valve; and means at the trailing end of the valve body barring access to the second valve.

2. In a system for feeding an additive at a predetermined rate into a confined moving liquid, a combination according to claim 1 in which the first valve takes the form of a needle valve at the leading end of the valve body.

3. In a system for feeding an additive at a predetermined rate into a confined moving liquid, a combination according to claim 1 in which the second valve takes the form of a check valve biased by the resilient means toward closed position.

References Cited in the file of this patent

UNITED STATES PATENTS

| | | |
|---|---|---|
| 128,663 | Ross | July 2, 1872 |
| 808,689 | Saugstad | Jan. 2, 1906 |
| 916,163 | Jettinger | Mar. 23, 1909 |
| 1,036,871 | Matheson | Aug. 27, 1912 |
| 1,791,350 | Caron | Feb. 3, 1931 |
| 2,107,631 | Erwin | Feb. 8, 1938 |
| 2,325,242 | Gordon | July 27, 1943 |
| 2,337,276 | Sanchis | Dec. 21, 1943 |
| 2,519,569 | Hart | Aug. 22, 1950 |
| 2,592,884 | Fox et al. | Apr. 15, 1952 |
| 2,637,470 | Wolcott | May 5, 1953 |
| 2,771,093 | Wilson | Nov. 20, 1956 |